United States Patent [19]
Craig et al.

[11] Patent Number: 5,856,402
[45] Date of Patent: *Jan. 5, 1999

[54] PROCESS FOR THE SYNTHESIS OF MULTI-MODAL AQUEOUS DISPERSIONS OF POLYSILOXANES

[75] Inventors: Daniel Horace Craig, Schenectady; Wayne Francis Morgan, Mechanicville, both of N.Y.

[73] Assignee: General Electric Company, Schenectady, N.Y.

[*] Notice: The term of this patent shall not extend beyond the expiration date of Pat. No. 5,726,270.

[21] Appl. No.: 774,454

[22] Filed: Dec. 30, 1996

[51] Int. Cl.[6] ...................................................... C08K 9/10
[52] U.S. Cl. ............................................................. 524/837
[58] Field of Search ..................... 524/731, 837, 524/838

[56] References Cited

U.S. PATENT DOCUMENTS

| | | |
|---|---|---|
| 2,891,920 | 6/1959 | Hyde et al. |
| 4,859,740 | 8/1989 | Damrath et al. |
| 4,861,831 | 8/1989 | Damrath et al. |
| 4,865,917 | 9/1989 | Lindner et al. |
| 4,885,209 | 12/1989 | Lindner et al. |
| 5,726,270 | 3/1998 | Craig .................................. 528/23 |

FOREIGN PATENT DOCUMENTS

| | | |
|---|---|---|
| 459500 | 5/1991 | European Pat. Off. |
| 62-141029 | 6/1987 | Japan. |

OTHER PUBLICATIONS

D.R. Weyenberg et al., J. Polymer Sci., "Anionic Emulsion Polymerization of Siloxanes", Part C (27), pp. 27–34, 1969.

D. Graiver et al., Rubber Chemistry and Technology, vol. 56, "Emulsion Polymerized Polydimethylsiloxane", pp. 918–926 (1983).

J.C. Saam et al., Journal of Polymer Science: Polymer Chemistry Edition, vol. 20, "Condensation Polymerization of Oligomeric Polydimethylsiloxanols in Aqueous Emulsion", pp. 3351–3368 (1982).

T.M. Obey et al., Journal of Colloid and Interface Science, 163, "Novel Monodisperse 'Silicone Oil'/Water Emulsions", pp. 454–463 (1994).

K.R. Anderson, Langmuir 1994, 10, "Surfactant–Stabilized Silicone Oil in Water Emulsion", pp. 2493–2494 (1994).

*Primary Examiner*—Melvin I. Marquis
*Assistant Examiner*—D. Aylward
*Attorney, Agent, or Firm*—Noreen C. Johnson; Douglas E. Stoner

[57] ABSTRACT

A process for the acid-catalyzed synthesis of polysiloxane emulsions is discussed. The process comprises preheating an aqueous reaction mixture, optionally comprising polysiloxane emulsion seeds, and optionally containing a surfactant, to a temperature of up to about 110° C. and adding to the aqueous reaction mixture, water, an acid catalyst surfactant, and a polysiloxane precursor to form a polysiloxane emulsion comprising essentially multi-modal, optionally multi-layered particles having desired multi-modal particle sizes in a range of from about 100 nm to about 2 microns.

10 Claims, No Drawings

PROCESS FOR THE SYNTHESIS OF MULTI-MODAL AQUEOUS DISPERSIONS OF POLYSILOXANES

FIELD OF THE INVENTION

A process for the acid-catalyzed synthesis of polysiloxane emulsions is discussed. The process uses a kinetic excess of the acid catalyst surfactant to yield multi-modal, optionally multi-layered polysiloxane emulsions.

BACKGROUND OF THE INVENTION

The manufacture of aqueous polysiloxane emulsions is a widely practiced art typically resulting in aqueous dispersions of broad particle size distributions. These dispersions have a broad utility, including the personal care, adhesives, and coating industries.

Current manufacturing practices encompass emulsification, into water, of pre-existing polysiloxane fluids and/or gums via standard high shear homogenization techniques to directly yield the dispersions. Alternatively, it is known to batch stir polysiloxane precursors in water in the presence of surfactants, under low shear non-homogenizing conditions, subsequent to thermal emulsion polymerization to yield the polysiloxane dispersion. These processes yield a dispersion having a broad particle size distribution. As in many areas of technology such as coatings, adhesives, inks, personal care and the like, which utilize polymer particles, particle size control can be critical to attain optimum performance of the material in its end use application. This is also true for polysiloxane emulsions where particle size has become increasingly important, for example in designing dispersions for the personal care industry.

Examples of Polysiloxane Emulsion polymerization processes have been known. Base catalyzed emulsion polymerization is disclosed in U.S. Pat. No. 2,891,920, which describes the process as base catalyzed with a cationic surfactant. European patent application EP 459500 A2 911204 also discloses a base catalyzed emulsion polymerization process. A base catalyzed emulsion polymerization process is thus described to comprise a process proceeding via an ionic mechanism involving pre-emulsifying cyclosiloxanes into water in the presence of a cationic surfactant and a source of hydroxide ion. These base catalyzed emulsion polymerization processes can yield high molecular weights, however reaction times are very long.

Acid catalyzed emulsion polymerization of siloxanes is also known. *Journal of Polymer Science*, Part C (27), 27, 1969 discusses the use of dodecylbenzenesulfonic acid as a catalyst and surfactant for the synthesis of polydimethylsiloxane emulsions from permethylcyclo-siloxanes.

Semi-continuous processes for polysiloxane emulsions are described in Japanese patent application JP62141029 A2 870624. This process utilizes a continuous addition of a pre-emulsion of cyclosiloxanes precursor to a reactor containing large amounts of acid catalyst emulsifier. Particle sizes of polysiloxane emulsions thus formed are normally restricted to sizes below 150 nm.

Given the variety of processes disclosed for the production of polysiloxane emulsions, it is surprising that emulsion processes are still being sought which will allow simultaneous control of polysiloxane molecular weight as well as the dispersion particle size within a narrow range. It is also surprising that a process for acid catalyzed synthesis of high molecular weight pure polysiloxane emulsions having a particle size in the range of 50 nm to a few microns is not available. It is further surprising that polysiloxane emulsions containing bimodal or multimodal particle size distributions have not been described. Polysiloxane emulsions having such a particle size distribution can provide improved polysiloxane deposition and film formation in skin care products, and would also allow the manufacture of very high emulsion solids, for example, up to 75% by weight of high molecular weight polysiloxanes, at workable emulsion viscosities. Strict control of particle size and distribution would allow specific tailoring of the dispersion to the application, with a resulting increase in performance efficiency.

Publications that relate to polysiloxane emulsion technology surprisingly do not provide a process to make essentially multi-modal, or multi-modal and multi-layered particles. Multi-modal multi-layered particles can provide dispersions with multiple properties. Thus for example, different properties can be imparted to each layer or to each mode, of the particles in a polysiloxane emulsion.

There is thus a need to provide polysiloxane emulsions with multi-modal particle size control in the particle size range of about 50 nm to a few microns. There is also a need to provide a process to make multi-modal polysiloxane emulsions having a predetermined particle size within the aforementioned particle size range. There is also a need to provide polysiloxane dispersions containing particles possessing multi-layered structures, and a process for making such multi-layered particles.

SUMMARY OF THE INVENTION

The instant invention is related to a process to make polysiloxane emulsions, comprising (a) preheating an aqueous reaction mixture (A), optionally comprising polysiloxane emulsion seeds, and optionally containing a surfactant, to a temperature of up to about 110° C.; and (b) adding to the aqueous reaction mixture (A), a mixture (B) comprising polysiloxane precursor, an acid catalyst-surfactant, and water, to form a polysiloxane emulsion comprising essentially multi-modal, optionally multi-layered particles having a pre-determined particle size ranging from about 50 nm to about 2 microns.

Also provided by the instant invention is a process wherein to the preheated reaction mixture (A) is concurrently/simultaneously added water, an acid catalyst surfactant and a polysiloxane precursor to form a polysiloxane emulsion comprising essentially multi-modal, optionally multi-layered particles having a pre-determined particle size ranging from about 50 nm to about 2 microns.

DETAILEWD DESCRIPTION OF THE INVENTION

The instant invention is related to a process to make polysiloxane emulsions, comprising (a) preheating an aqueous reaction mixture (A), optionally comprising polysiloxane emulsion seeds, and optionally containing a surfactant, to a temperature of up to about 110° C.; and (b) adding to the aqueous reaction mixture (A), a mixture (B) comprising polysiloxane precursor, an acid catalyst-surfactant, and water, in a ratio of from about 70:1:29 to about 75:5:20, to form a polysiloxane emulsion comprising essentially multi-modal, optionally multi-layered particles having a pre-determined particle size ranging from about 100 nm to about 2 microns.

In one aspect of the instant invention the mixture (B) is added in portions to reaction mixture (A) over a period of up to 24 hours. As provided by the instant invention, the polysiloxane seeds, if present, typically range in size from about 100 nm to about 1000 nm. It is however understood that the size of such seeds can vary below 100 nm and above 1000nm.

The reaction mixture (A) used in the instant process can be preheated to a desired functional temperature. Typically the reaction mixture (A) is preheated to a temperature of 30° C. to about 110° C. The preferred temperature range is from about 75° C. to about 95° C. The instant process can, however, function at temperatures below 30° C. and above 110° C.

As provided by the instant invention, various surfactants can be used in the process of the instant invention. Acid catalyst-surfactants useful in the instant invention include surface-active sulfonic acids including alkyl-, alkylaryl-, aryl-sulfonic acids, mixtures of surface-active sulfonic acid salts with strong mineral acids or acids derived from monoalkyl, mono(alk-aryl) and mono(aryl) sulfates, mixtures of the salts of monoalkyl, mono(alk-aryl) and mono (aryl) sulfates and strong mineral acids. One may also use the various sulfonic acid catalysts/surfactants described in U.S. Pat. No. 3,294,725 which is incorporated herein by reference. Preferred surfactants include salts of alkyl, alkenyl, or alk-aryl sulfonic acids. A particularly preferred catalyst/surfactant is dodecylbenzenesulfonic acid.

The instant invention uses polysiloxane precursors which are capable of undergoing condensation reactions. Preferred siloxane precursors are cyclosiloxanes which are described in the Encyclopedia of Polymer Science and Engineering, Volume 15, 2nd Edition (1989), John Wiley and Sons. Particularly preferred are mixtures of cyclosiloxanes and octamethylcyclotetrasiloxane.

Another embodiment of the instant invention provides a process to make multi-modal, optionally multi-layered polysiloxane emulsions, comprising the steps of, (a) preheating an aqueous reaction mixture (A), optionally comprising polysiloxane emulsion seeds, and optionally containing a surfactant, to a temperature of up to about 110° C.; and (b) concurrently/simultaneously adding to the aqueous reaction mixture (A), water, an acid catalyst surfactant, and a polysiloxane precursor to form a polysiloxane emulsion comprising essentially multi-modal, optionally multi-layered particles having a pre-determined particle size ranging from about 100 nm to about 2 microns.

Further preferred is a process wherein, (a) the aqueous reaction mixture (A) is preheated to a temperature of about 85° C. to about 950° C., comprises polysiloxane emulsion seeds from about 5% to about 50% by weight of the reaction mixture (A); and (b) concurrently adding a polysiloxane precursor, an acid catalyst surfactant, and water in a ratio of from about 70:1:29 to about 75:5:20, respectively.

A particularly significant aspect of the instant invention is controlling the amount of acid catalyst present, while the siloxane precursor is being added to the reaction mixture (A). Controlling the amount of the acid catalyst helps prevent undesirable formation of new polysiloxane emulsion particles derived solely from the addition of pre-emulsion thereby forming a mono modal polysiloxane emulsion. Once the particles of the polysiloxane emulsion reach a desired size an excess amount, usually up to about 5% by weight of the polysiloxane precursor, of the acid catalyst surfactant is added followed by the addition of the polysiloxane precursor. The excess acid catalyst surfactant leads to the formation of new polysiloxane emulsion particles having a particle size which is usually smaller than the particle size of the polysiloxane emulsion that was formed before the addition of an excess of the acid catalyst surfactant.

Polysiloxane compositions contemplated for synthesis into emulsion form utilizing the process of the instant invention can comprise linear, branched, cross linked and functionalized polysiloxanes derived from linear silanols, bifunctional siloxanes or cyclosiloxanes, including copolymers of linear polysiloxanes with mono-, di-, tri- or tetra-functional siloxane monomers, reactive group containing alkoxy silane monomers such as epoxy, amino, carboxy, vinyl and hydride containing reactive mono—, di—and tri-functional materials. Thus silicone fluids, gums, resins and organo and hydride functional derivatives would be included in the emulsion compositions contemplated herein.

The advantages of the instant invention include the ability to form multi-modal polysiloxane emulsions with the ability to control the particle size of the polysiloxane emulsions. It is thus possible to achieve polysiloxane emulsions having a particle size in the range of about 50 nm to a few microns.

A process provided by the instant invention can use previously synthesized polysiloxane emulsions to act as emulsion seeds that serve as the core for the multi-layered particles formed by the instantly claimed invention. The newly synthesized polysiloxanes form around the emulsion seeds forming the outer layer, thus yielding the core-shell structure. At this point excess acid catalyst-surfactant can be added to the reaction mixture followed by the addition of the poly siloxane precursor to form a new emulsion comprising particles with a smaller particle size as compared to particle size of the bilayer particles already present in the reaction mixture.

It is of course possible that these core-shell structured particles can be re-introduced in the reaction mixture, to act as emulsion seeds, thereby leading to the formation of a polysiloxane emulsion having triple layered particles. This process can be repeated to yield polysiloxane emulsions having multiple layered particles followed by the addition of excess acid catalyst surfactant and a polysiloxane precursor as discussed above. It should also be noted that the addition of an excess amount of the acid catalyst surfactant can be repeated to form a tri-modal or higher polysiloxane emulsion.

One advantage of obtaining multi-modal, optionally multi-layered particles is that each size and layer can have distinct, similar or dissimilar properties. Thus, for example, the core can be made of a crosslinked polysiloxane to provide film toughness. This core can then have an outer layer of linear polysiloxane which is known to provide good film forming properties. A bimodal distribution can be designed which provides good penetration from small particles, and good surface film formation from large particles for use in coatings, for instance.

The process of the instant invention can function with or without a surfactant in the aqueous reaction mixture (A). A surfactant helps stabilize the growing polysiloxane particles in the aqueous reaction medium. Typical surfactants that can be used in the instant invention include those selected from known groups of anionic, nonionic, or amphoteric surfactants. Preferred are anionic surfactants such as sulfates or sulfonates.

The polysiloxane precursors utilized in the instant process are generally cyclosiloxanes that can have different characteristics. These cyclosiloxanes form silanols, i.e., a —Si—OH group attached to a functionalized or non-functionalized polymer chain from acid-catalyzed ring opening reactions. It is believed that the final polysiloxane emulsions are formed by a condensation reaction, generally in the presence of an acid catalyst, thereby forming a [—Si—O—Si—] linkage. A typical example of the pre-emulsion siloxane precursor is octamethylcyclotetrasiloxane. A comprehensive list of the siloxane precursors can be found in "Silicones", Hardman & Torkelson, *Encyclopedia of Chemical Technology*, Volume 15, pp. 205–308, John Wiley & Sons, and is incorporated herein by reference.

As described herein, mono-modal signifies particle size in a narrow size distribution. Thus, for example, a mono-modal emulsion would mean an emulsion comprising particles having a size distribution in a narrow range. The size distribution can vary from about 50 nm to a few microns, as discussed above. As described herein multi-modal signifies a mixture of two or more mono-modal poly siloxane emulsions.

The different aspects of the instant invention are illustrated by the following examples. These examples illustrate the applicability of the process of the instant invention in providing an optionally multi-layered, multi-modal polysiloxane emulsion with lower emulsion viscosity than the viscosity of a corresponding broad distribution emulsion of the same average particle size, and layered/core-shell particle structures. It should be noted that a process of the instant invention utilizes the acid catalyst-surfactants, the polysiloxane precursors and the polysiloxane emulsion seeds discussed above. The following examples only illustrate the process of the instant invention and should not be construed to limit the scope of the instant invention in any manner.

Example 1

Into a three-neck 1000 ml round bottom flask, equipped with a stirrer, a condenser, one feedport, a temperature probe, and a heating mantle was added 150 g of a 47.7% solids polysiloxane emulsion with particle size Dv=670 nm, Dn=585 nm, and Dv/Dn=1.14. The mixture was agitated continuously and heated to 85° C. at which point a pre-emulsified mixture of 100 g water, 4g dodecylbenzenesulfonic acid, and 310 g octamethylcyclotetrasiloxane was added to the reactor over 90 minutes. The reaction mixture was heated for an additional 2 hours beyond the completion of the addition of the pre-emulsion, then cooled to room temperature and characterized.

Example 2

Into a three-neck 1000 ml round bottom flask, equipped with a stirrer, a condenser, one feedport, a temperature probe, and a heating mantle was added 150 g of a 50.4% solids polysiloxane emulsion with particle size Dv=880 nm, Dn=643 nm, and Dv/Dn=1.4, and containing a polysiloxane core derived from a 97/3 mixture of octamethylcyclotetrasiloxane and tetramethyltetravinylcyclotetrasiloxane. The mixture was agitated continuously and heated to 86° C. at which point a pre-emulsified mixture of 100 g water, 4 g dodecylbenzenesulfonic acid, and 310 g octamethylcyclotetrasiloxane was added to the reactor over 135 minutes. The reaction mixture was heated for an additional 2 hours beyond the completion of the addition of the pre-emulsion, diluted with an additional 150 g water, heated for 2 more hours at 86° C., then cooled to room temperature and characterized.

Example 3

Into a three-neck 1000 ml round bottom flask, equipped with a stirrer, a condenser, one feedport, and a temperature probe was added 150 g of a 52% solids polysiloxane emulsion with particle size Dv=540 nm, Dn=242 nm, and Dv/Dn=2.2 and 3% by weight of polysiloxane of tetramethyltetravinylcyclotetrasiloxane copolymerized therein, 250 g water, and 3 g dodecylbenzenesulfonic acid, and the mixture stirred at room temperature until homogeneous. 310 g of 3,000 cps linear polydimethylsiloxane was then added to the mixture, which was stirred for an additional 24 hours at room temperature then characterized.

Example 4

Into a 1000 ml baffled resin kettle, equipped with a stirrer, one feedport, and a temperature probe was added 132 g water. The reactor was placed in a water bath and the contents heated to 85° C. During the heating process 40 g of a pre-emulsified mixture of 126 g water, 342 g octamethylcyclotetrasiloxane and 3.4 g dodecylbenzenesulfonic acid was added over 20 minutes to form an "in-situ" seed. Once the reactor contents had stabilized, the remainder of the pre-emulsified mixture was pumped into the reactor over 190 minutes. The reaction mixture was maintained at 85° C. for an additional 100 minutes beyond the addition of the pre-emulsion, then cooled to room temperature and characterized.

Example 5

Into a three-neck 1000 ml round bottom flask, equipped with a stirrer, a condenser, one feedport, a temperature probe, and a heating mantle is added 150 g water and 135 g of a 50.2% solids polysiloxane emulsion having particle size Dv=1167 and Dn=758. The mixture is agitated continuously and heated to 86° C. at which point two separate feeds (1) a mixture of 100 g water and 6.5 g dodecylbenzenesulfonic acid (DDBSA-Witco 1298), and (2) 312 g octamethylcyclotetrasiloxane ($D_4$) are added concurrently via separate pumps to the reactor over 104 minutes. The reaction mixture is heated for an additional 4 hours beyond completion of the addition of the pre-emulsion, with an additional 200 g water added one hour into the post heating period to lower reaction mixture viscosity and ensure adequate mixing, then cooled to room temperature and characterized.

Weight percent solids were determined utilizing a CEM Labwave 9000 gravimetric microwave drier, with 20 minute heat times and at full microwave output. Particle size distributions were obtained utilizing a Nicomp 370 Submicron Particle Sizer instrument applying a Nicomp analysis protocol. Viscosity measurements were taken utilizing a Brookfield Model RV viscosimeter. Data collected for the resulting dispersions are provided in Table 1.

TABLE 1

| | | | Properties of Polydimethylsiloxane Emulsions | | | |
|---|---|---|---|---|---|---|
| Sample | Solids % by weight | Seed particle Size (nm) | | SF Emulsion PSD (nm) | | Comments |
| | | Dv | Dn | Dv | Dv | |
| 1 | 59.9 | 670 | 585 | 91 (66%) | 785 (34%) | 0.6% DDBSA cont. (280 cps) |
| 2 | 51.3 | 880 | 643 | 127 (45%) | 1045 (55%) | 0.65% DDBSA cont., (425 cps) |
| 3 | 56.5 | 540 | 242 | 307 (17%) | 1007 (83%) | 0.6% DDBSA cont. |

TABLE 1-continued

| | | Properties of Polydimethylsiloxane Emulsions | | | | |
|---|---|---|---|---|---|---|
| | Solids | Seed particle Size (nm) | | SF Emulsion PSD (nm) | | |
| Sample | % by weight | Dv | Dn | Dv | Dv | Comments |
| 4 | 51.8 | 315 "in situ" | 146 | 46 (17.5%) 708 (66.5%) | 175 (16%) | in situ seed formed; 0.6% DDBSA cont. |
| 5 | 39 | 1167 | 758 | 117 (952%) | 650 (48%) | reaction diluted with water during post cook to ensure adequate mixing |

Dv = volume average particle diameter in nanometers
Dn = number average particle diameter in nanometers
cps = viscosity in centipoise
% DDBSA = weight % DDBSA based on total recipe
cont. = continuous addition

What is claimed is:

1. A process to make polysiloxane emulsions, comprising:
   (a) preheating an aqueous reaction mixture (A), optionally comprising polysiloxane emulsion seeds, and optionally containing a surfactant, to a temperature of up to about 100° C.; and
   (b) concurrently adding to the aqueous reaction mixture (A), a mixture (B) comprising water, an acid catalyst surfactant, and a polysiloxane precursor to form a polysiloxane emulsion comprising multi-modal, optionally multi-layered particles having desired multi-modal particle size in the range of from about 100 nm to about 2 microns.

2. A process of claim 1 wherein the mixture (B) is added over a period of up to 24 hours.

3. A process of claim 2 wherein the surfactant is a salt of alkyl, alkenyl, and alkaryl sulfonic acids.

4. A process of claim 1 wherein the polysiloxane emulsion seeds range in size from about 250 nm to about 1000 nm.

5. A process of claim 3 wherein the aqueous reaction mixture (A) is preheated to a temperature of about 100° C.

6. A process of claim 5 wherein the polysiloxane precursor is a cyclosiloxane.

7. A process of claim 6 wherein the acid catalyst-surfactant is selected from alkyl, alkaryl, and aryl sulfonic acids.

8. A process of claim 7, wherein,
   (a) the aqueous reaction mixture (A) is preheated to a temperature of about 85° C. to about 95° C., comprises polysiloxane emulsion seeds from about 5% to about 50% by weight of the reaction mixture (A); and
   (b) concurrently adding a polysiloxane precursor, an acid catalyst surfactant, and water in a ratio of from about 70:1:29 to about 75:5:20, respectively.

9. A process of claim 8 wherein the reaction mixture is heated to about 86° C.; the polysiloxane precursor is octamethylcyclotetrasiloxane or a mixture of cyclosiloxanes; and the acid catalyst-surfactant is dodecylbenzenesulfonic acid.

10. A multi-modal polysiloxane emulsion prepared by the process of claim 1.

* * * * *